(No Model.) 2 Sheets—Sheet 1.
J. CASNER.
APPARATUS FOR REMOVING SHEETS OF GLASS FROM ANNEALING OVENS.
No. 324,533. Patented Aug. 18, 1885.
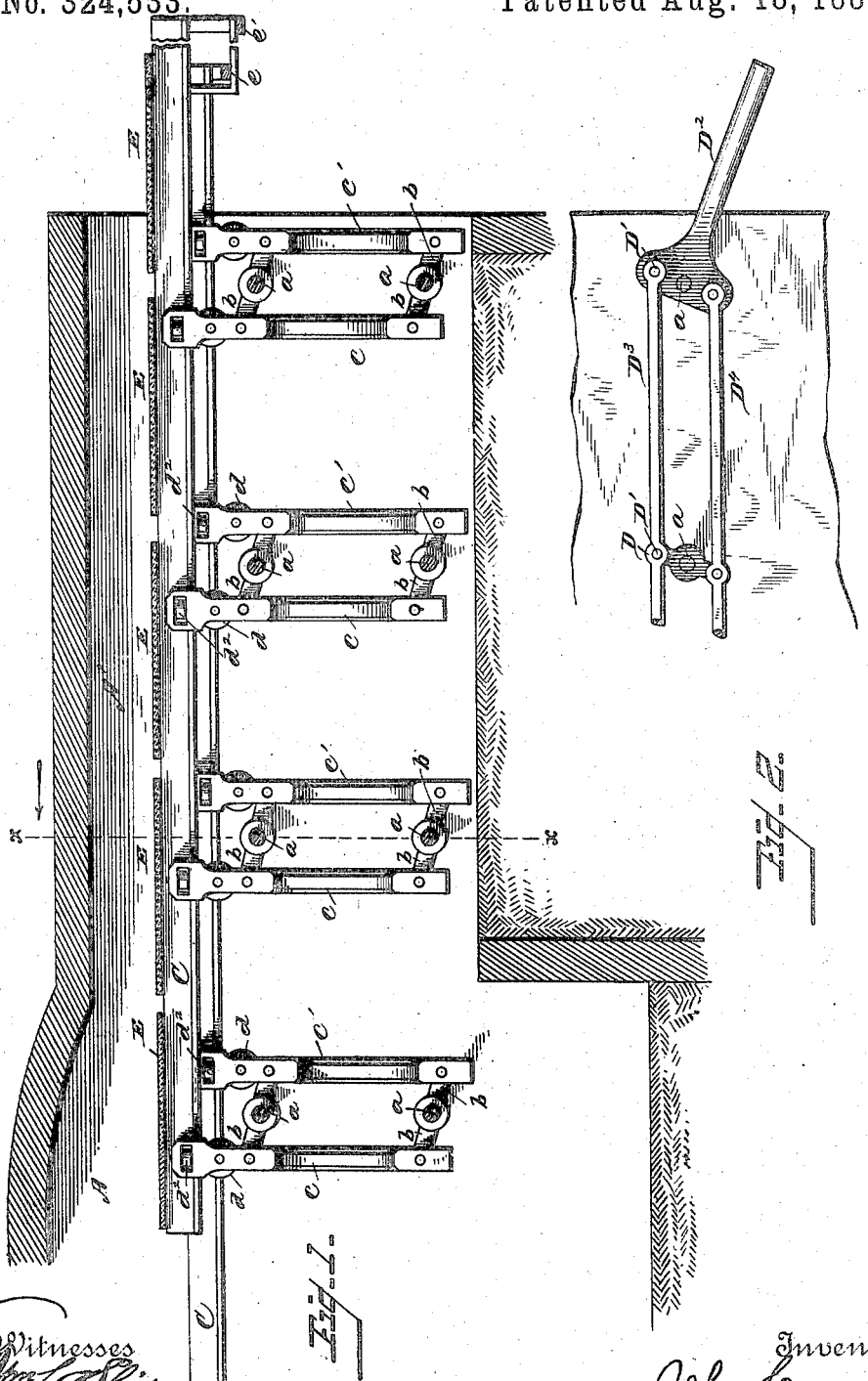
Witnesses
Inventor
John Casner,
By his Attorney
Franklin H. Hough

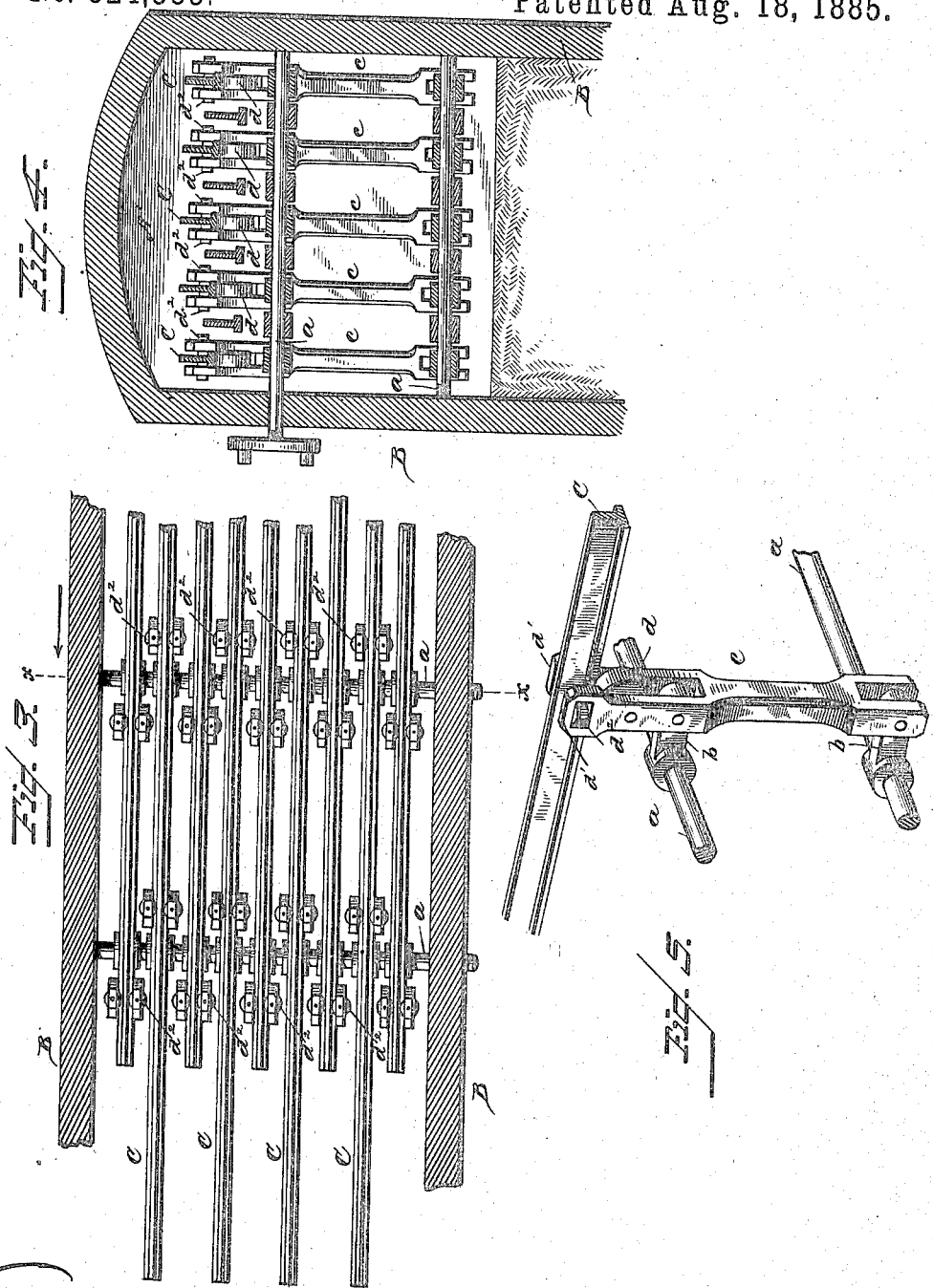

UNITED STATES PATENT OFFICE.

JOHN CASNER, OF COVINGTON, PENNSYLVANIA.

APPARATUS FOR REMOVING SHEETS OF GLASS FROM ANNEALING-OVENS.

SPECIFICATION forming part of Letters Patent No. 324,533, dated August 18, 1885.

Application filed May 13, 1885. (No model.)

*To all whom it may concern:*

Be it known that I, JOHN CASNER, a citizen of the United States, residing at Covington, in the county of Tioga and State of Pennsylvania, have invented certain new and useful Improvements in Apparatus for Removing Sheets of Glass from the Annealing-Oven; and I do hereby declare the following to be a full, clear, and exact description of the invention, such as will enable others skilled in the art to which it appertains to make and use the same, reference being had to the accompanying drawings, which form a part thereof.

The object of this invention is to improve upon the devices heretofore used for removing plate and sheet glass from the annealing-furnace. In devices of this class now in use one set of bars has been constructed to reciprocate between the other, one set being stationary—that is, as to movement in a longitudinal direction—no means have been provided for preventing the bars from getting off their supporting-standards and yet leaving them free to expand and contract without straining or springing the bars; and other defects have been discovered, all of which I seek to overcome by the improvements now to be described.

The invention consists in certain novel details of construction, hereinafter more fully described, and then specifically pointed out in the claims.

Referring to the accompany drawings, Figure 1 is a vertical longitudinal section of my improved device, showing also the annealing-arch and a portion of the furnace. Fig. 2 is a detail of a portion of the operating-levers and connecting-rods. Fig. 3 is a plan. Fig. 4 is a cross-section through the line $x\, x$ of Fig. 1. Fig. 5 is a detail.

My invention relates neither to the furnace nor the annealing-arch, nor to the mode of flattening the glass; hence it will not be necessary to show or describe these parts further than is necessary to the understanding of my invention.

In the drawings, A represents a portion of the furnace in which the plates of glass are heated and flattened, and A' is the annealing-arch.

B B are the side walls of the annealing-arch, in which are journaled the shafts $a\, a$. These shafts are arranged in pairs one above the other, as shown in Fig. 1; and while I have shown and shall describe four sets of these shafts, it is evident that a greater or less number may be used, according to the length of the annealing-chamber.

$c$ are arms designed to support the bars C, and $c'$ are similar arms designed to support the bars C'. Each of these arms is bifurcated at each end, as shown, and in the fork of the lower end is pivoted the crank-arm $b$, the opposite end of which is sleeved on its appropriate shaft $a$. These arms $c\, c'$ are located upon opposite sides of their shaft, and consequently the crank-arms $b$ of each set extend in opposite directions. The upper ends of these arms are connected to the upper shafts in a similar manner. In the upper ends of each of these arms $c\, c'$ is journaled an anti-friction roller, $d$, upon which rest the bars C C'. These bars are preferably T-shaped in cross-section, although a cruciform or tubular bar may be sometimes used. The base of this bar rests upon the roller $d$, and in recesses formed in the top of the arms $d'$ of the arms $c\, c'$ are journaled the horizontal friction-rollers $d^2$, beneath which the flange of the bars C C' projects, and the bars are thus prevented from rising, and yet are free to expand as they become heated. The rollers $d^2$ bear against the sides of the vertical portion of the bars and assist them in their reciprocating movement.

The bars C C' are arranged in two sets, and while these sets may be composed of more or less bars I have found from experience that four in one set and five in the other is best suited for the purpose, and hence have so shown them in the drawings. The bars of each set are connected together at their outer ends by the cross-bars $e\, e'$. The upper shafts $a$ extend through the side walls of the annealing-arch upon one side thereof, and pivoted upon each of these shaft-extensions except the outer one is a two-armed lever, D, each arm of which is provided near its outer end with a pin, D'.

Upon the projecting end of the outer shaft $a$ is pivoted the three-armed lever, $D^2$, the short arms of which are provided with pins similar to those on the levers D. The long arm of this lever forms a means for operating the bars C C'.

D³ D⁴ are connecting-bars joining the lever D² with the next adjacent lever D, and similar bars connect each two adjacent levers D.

In operation the operating-lever is turned so as to raise one set of bars, when they receive a plate or sheet of glass from the ordinary revolving wheel on which the plates are flattened in the usual manner. The operator then takes hold of the cross-bar connecting these bars and pulls toward him, which causes the ends to move, with the sheet of glass upon them, until the sheet of glass comes over the ends of the other set of bars. The operator then moves the lever D² in the opposite direction, so as to lower the bars on which the glass now rests, the same movement of the lever raising the other set of bars, which, coming in contact with the glass, raises it off of the set being lowered, and the glass is thus transferred from one set of bars to the other. Take off one sheet of glass, then lower the bars and push into the furnace glass being placed on the upper bars, when the operation is repeated.

By the reciprocating motion of the bars, together with the raising and lowering of both sets of bars, a gentle change of the sheets is had from one set of bars to the other, and the glass moves onward through the annealing-chamber until, as seen in Fig. 1, a series of sheets, E, fill the chamber, after which the operator, at each reciprocal movement of the bars, removes from the exit a sheet of glass. This he repeats as long as the furnace is in operation.

Having thus described my invention and set forth its merits, what I claim as new is—

1. In a device for the purpose described, two sets of longitudinally-reciprocating bars loosely mounted upon oscillating arms, combined with the friction-rollers $d$ and horizontal rollers $d^2 d^2$, as and for the purposes set forth.

2. In a device for the purpose described, the combination of the shafts $a$, vertical bifurcated arms $c\ c'$, the crank-arms $b$, sleeved on the shaft and its opposite end pivoted in the lower forks of said arms, and the bars C C', loosely secured in the upper bifurcated ends of said arms, as and for the purposes set forth.

3. In a device for the purpose described, the vertical arms $c\ c'$, carrying friction-rollers $d$ and horizontal rollers $d^2 d^2$, combined with the bars C C', the flanges of which extend beneath said rollers $d^2 d^2$, as and for the purposes set forth.

4. The vertical arms $c\ c'$, bifurcated, as shown, the friction-rollers $d$, journaled between the forks thereof, and the rollers $d^2 d^2$, journaled in recesses in said bifurcated arms, combined with the T-shaped bars, the base of which rests upon the rollers $d$, and the flange passed beneath the rollers $d^2 d^2$, which bear against the vertical portions of said bars, as and for the purpose set forth.

5. The combination of the shafts $a$, vertical arms $c\ c'$, the crank-arms $b$, connecting said arms upon opposite sides of said shafts, the levers D D D D², upon projecting ends of said shafts, and the connecting-bars D³ D⁴, joining said levers, as and for the purpose specified.

In testimony whereof I affix my signature in presence of two witnesses.

JOHN CASNER.

Witnesses:
S. C. BECKWITH,
C. M. WEEKS.